United States Patent [19]

Cornwell

[11] Patent Number: 4,769,044

[45] Date of Patent: * Sep. 6, 1988

[54] HIGH BTU FUEL ELEMENT

[76] Inventor: James Cornwell, 1125 SW. 27th Ave., Boynton Beach, Fla. 33435

[ * ] Notice: The portion of the term of this patent subsequent to Jun. 2, 2004 has been disclaimed.

[21] Appl. No.: 43,954

[22] Filed: Apr. 29, 1987

Related U.S. Application Data

[63] Continuation-in-part of Ser. No. 771,650, Sep. 3, 1985, Pat. No. 4,670,018.

[51] Int. Cl.$^4$ .......................... C10L 5/44; C10L 5/46; C10L 5/48
[52] U.S. Cl. ......................................... 44/605; 44/14; 44/606
[58] Field of Search .......................... 44/1 D, 1 E, 4-6

[56] References Cited

U.S. PATENT DOCUMENTS

| | | | |
|---|---|---|---|
| 1,912,697 | 6/1933 | Fife | 44/6 |
| 3,547,605 | 12/1970 | Cornelius, III et al. | 44/4 |
| 3,642,458 | 2/1972 | Hess et al. | 44/1 D |
| 4,670,018 | 6/1987 | Cornwell | 44/1 E |

Primary Examiner—Carl F. Dees
Attorney, Agent, or Firm—Allegretti & Witcoff, Ltd.

[57] ABSTRACT

A fuel element made from highly compressed comminuted cellulose wastes, finely divided aluminum or magnesium and water. The element upon burning emits great quantities of heat due to the generation of hydrogen by reaction of the metal with the water (steam). In a preferred form of the invention, the element is coated with a layer of finely divided metal and has an external layer of paraffin.

9 Claims, 1 Drawing Sheet

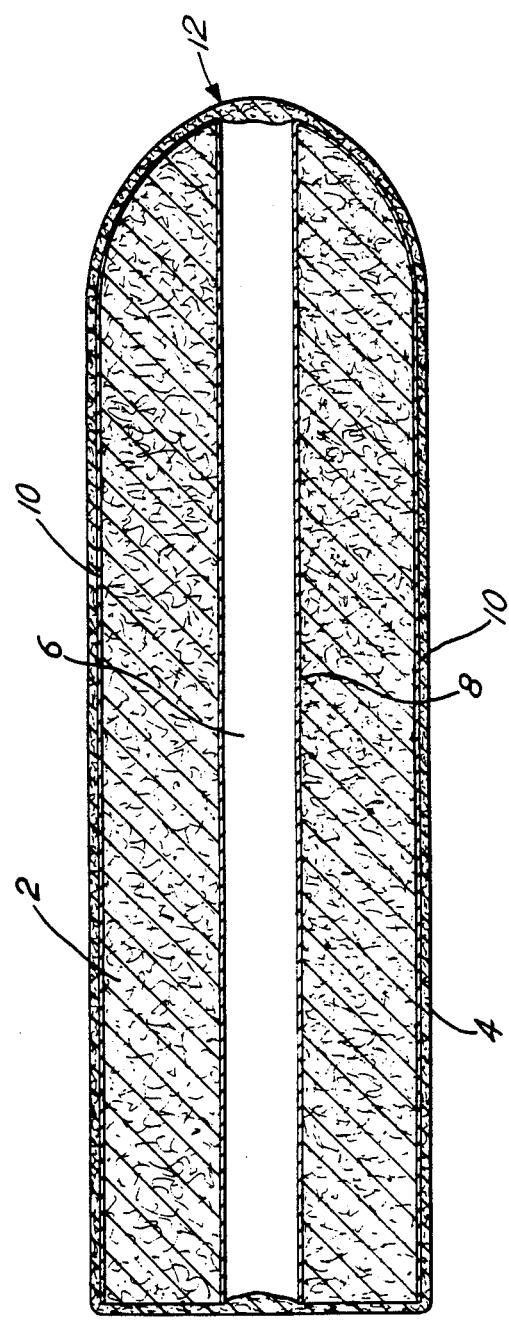

HIGH BTU FUEL ELEMENT

This invention is a continuation-in-part of Ser. No. 771,650 filed Sept. 3, 1985 now U.S. Pat. No. 4,670,018.

This invention relates to a fuel element in the form of a molded "log" made from waste materials which burns with the evolution of great quantities of heat.

Fuel elements in the form of pellets or logs have been made by converting comminuted wood and municipal waste material to produce a uniform low moisture content element. But such fuels have limited use and are not cost effective. The capital cost for equipment to produce the pellets is high. Costs to ship the fuel to power plants outside the immediate area add still further to the price of the product so that it provides no cost advantage per unit of heat evolved vis-a-vis coal or oil. Usually, it is more economical to burn the waste directly without removing moisture or otherwise processing it in a plant near where the waste originates.

The object of the present invention is to provide a heating element made entirely from waste materials and characterized by extremely high heat to weight ratio.

The heating elements of the invention consist of molded comminuted cellulosic material having a coating of finely divided metal such as aluminum or magnesium. In addition to the finely divided metal on the surface of the heating element some of the finely divided metal may be incorporated uniformly throughout the comminuted cellulosic material to further increase the amount of heat generated. These molded elements are sometimes referred to herein as logs since they resemble logs because of their cylindrical shape. However, the shape is not critical. The elements may be produced as bricks, spheres, pyramids or other geometric shapes. Logs are preferred for domestic stoves. For commercial boilers the shape is of little consequence. Preferably, the metal coated element is enclosed in a shell of hardened matted fibrous material, such as peat or composted municipal waste to prevent breakage of the logs during handling, as for example, in stacking the logs on pallets for shipment. Without a protective coating the grannular metal on the surface will abrade off.

The source of the cellulosic material is old paper, shredded documents, cardboard, wood, as in the form of discarded pallets, and similar waste materials that are readily available near the plant where the heating lots are to be made. For example, the following cellulosic materials in the form of waste products e.g., sweepings from processing plants, are also useful: banana bark, bamboo, melaluca, straw, wheat and grain, coffee, cocoa beans, coconut fibers and palm wood.

Aluminum powder is generated in large quantities as a waste product in the manufacture and polishing of aluminum disks as the substrate for a magnetic coating used in the memory of computers. The disk must be very smooth. Aluminum waste is produced as coarse chips having a particle size of about 125 microns and fines with a particle size of 5–20 microns. This material is considered a hazardous waste under environmental regulations. Some disks are magnesium, the polishing of which results in finely-divided magnesium waste. Magnesium waste is also produced in the manufacture of wheels and anti-tank hand grenades. For use in the invention the metal is ground to a particle size of between 5 and 20 microns. Below 5 microns the metal dust constitutes a health hazard. Above about 20 microns aluminum particles tend to clinker more readily, particularly if combustion takes place without adding oxygen to the combustion chambers.

The paper, cardboard, wood, and other cellulosic waste is comminuted in a hammer mill, a Bomatic granulator or a similar comminuting device to produce a mixture of paper particles resembling confetti and slivers of wood from $\frac{1}{4}$ to $\frac{3}{8}$ inches long. The comminuted material in the form of a slurry is charged into a vat together with 2% to 5% sulfuric, acetic or hydrochloric acid where it is agitated at a temperature of 100° F. for about 45 minutes to hydrolize some of the cellulose and gums in the wood and remove ink from the paper. The hydrolyzed materials serve to bind the cellulose particles together during the compressing step of the process. A typical granulated material will contain about 50 parts by weight of paper pulp and about 25 to 30 parts of wood fibers. The relative proportions of these cellulose containing materials are not critical. When the hydrolysis is complete, the acid is neutralized by the addition of calcium hydroxide to bring the pH up to between 6.8 and 7.2. The comminuted material is now in the form of a slurry containing about 20% solids.

The comminuted hydrolyzed waste material is then injection molded into logs, bricks or any other desired shape. The molding is done using a screw or a hydraulic piston to force the slurry through an orifice into a jacketed two piece mold under 50 tons of force. The mold is maintained at a temperature of 110° F. The cavity for a log is about 4$\frac{1}{2}$ inches in diameter and from 10 inches to 16 inches long, one end being rounded. At this high pressure, the particles are bonded together and water is expelled from the comminuted mass through a port in the wall of the mold which is connected to a source of vacuum. To facilitate release of the molded log, the temperature of the mold is reduced to 55° F. The compressed product has a moisture content of about 35 to 40% by weight.

The compressed logs are then passed through a conventional oven or a microwave oven to drive off additional moisture. The logs are heated for a sufficient length of time to reduce the moisture to 9 to 12% by weight of the total weight of the log. This requires about 7$\frac{1}{2}$ minutes using high frequency heating.

The next step in the process is to coat the outside of the log with aluminum metal. The 20 micron aluminum powder is suspended in a liquid fluorinated hydrocarbon (Freon) in the proportion of about 3 parts of aluminum to one part of hydrocarbon and sprayed on the external surface of the dried compressed log. The coating has a thickness of about 0.125 inches and comprises from 6 to 7% by weight of the finished log. The ratio of aluminum to water in the finished product is critical and will range from 1.5:1 to 2:1. If the quantity of water is much in excess of that required to react with the aluminum the heat generated will be wasted in converting the excess water to steam. Magnesium will react in about the same proportions since it is only about 10% lighter than aluminum.

To prevent the metal coating and the surface particles of the element from abrading off during further handling, a compacted fibrous skin forming material is sprayed over the entire external surface of the log, as for example, an aqeous slurry of comminuted peat or fibrous composted municipal waste containing about 80% solids. This material is then dried to about 3% water whereupon it forms a hard shell of matted fibers encasing the log.

Promptly after this last drying step, the logs are dipped in a paraffin coating to prevent the hydroscopic cellulosic material from absorbing water from the air. This allows the product to be stored out-of-doors and/or shipped in bulk without protective packaging. As indicated above, the proportion of water to aluminum is critical since the proportions determine the rate at which the aluminum oxidizes during combustion of the logs.

To reduce the hygroscopic tendency of the fuel element the surface of the element may be coated with an oil sprayed over the metal skin of the dried log through a series of jets or nozzles at high velocity, prior to wrapping. Suitable oils are byproduct or waste oils of petroleum, banana, coconut, olive, peanut, corn, wheat germ, sawgrass and fish oils. In a preferred form of the invention the fuel element is dipped in paraffin, which provides a good abrasion-resistant coating for shipping, as mentioned above, and which burns readily.

In another form of the invention, finely divided metal can be incorporated in the body of the cellulosic element. It must be added to the comminuted cellulose after it has been neutralized and dried because if added to the slurry, the aluminum or magnesium will react prematurely with the acid in the slurry. The metal is sprayed onto the dried comminuted cellulosic material which is spread out in a thin layer as, for example, on a conveyor belt. The amount of aluminum or magnesium added to the cellulose must not exceed 30% by volume. Quantities of metal in excess of 30% will result in excess clinker formation when the fuel element is burned. The metalized cellulose is then molded under heat and pressure into the desired shape. It has a final moisture content after molding of 9-12% by weight. The dried material, of course, requires a greater molding pressure than that needed to mold the slurry.

Clinker formation is reduced at higher combustion temperatures which can be attained by adding oxygen in the form of forced air into the combustion chamber. Too high a proportion of aluminum in the cellulose body will result in the production of aluminum oxide rather than aluminum hydroxide and hydrogen, the desired reaction.

In the drawing the compressed mixture of comminuted wood and comminuted paper comprising the body of the log is indicated by the numeral 2. The entire external surface of the body of the element is coated with a thin layer 10 of aluminum about 0.125 inches thick. Over the entire outer surface of the log, there is a dried layer of matted fibers 4 which are stiff and hard to protect the aluminum layer and the outer surface of the body from being abraded. Alternatively, the coating can be a paraffin dip. It will be noted that the nose of the body is rounded or tapered as indicated at 12. When the logs are burned in a furnace or stove, they are placed nose down where the air coming into the furnace can circulate readily around the nose and be uniformly distributed. In an industrial boiler the geometry of the fuel element is not at all critical.

The external shell ignites quickly. As the heat is conducted to the interior of the log, the volatile constituents of the ligno-cellulosic materials evolve, as well as water. The water, of course, is converted to steam. The steam passes through the cellulosic body in contact with the internal aluminum particles and finally into contact with the aluminum on the surface. The steam with the aluminum reacts to produce hydrogen in accordance with the following reaction:

$$2Al + 2H_2O \rightarrow 2AlOH + H_2$$

The hydrogen generated in this reaction then burns to emit a large quantity of thermal energy in accordance with the following reaction:

$$2H_2 + O_2 \rightarrow 2H_2O + \Delta$$

The exothermic heat of this reaction amounts to 60,958 BTU's per pound of hydrogen. The water formed reacts with additional aluminum producing more hydrogen, until all of the aluminum has been reacted.

In the next step of thermal decomposition the cellulosic material pyrolyzes to form a char which burns relatively slowly to provide even heat in accordance with the following equation:

$$C + O_2 \rightarrow CO_2 + \Delta$$

The exothermic heat of reaction amounts to 9192 BTU per pound of carbon.

A log of the kind shown in the drawing 4½ inches in diameter and 10 inches long will weigh between two and seven pounds, depending upon the degree of compaction during molding. The seven pound log which has a density of about 75 #/ft.³ burns with the evolution of 104020 BTU. A similar heating element, without aluminum but of the same density, will generate 63000 BTU's. Thus, the construction of the invention produces 1.65 times as much heat energy as the prior art fuel elements.

As indicated, the water to aluminum ratio is critical. It is desirable to generate and burn the hydrogen in a controlled manner. If the water is excessive, the heat will be used to volatilize the water. On the other hand, if there is not sufficient moisture to react with all of the aluminum, less than the maximum amount of heat will be generated.

What is claimed is:

1. A molded fuel element comprising compacted cellulose waste, water and finely divided metal taken from the group consisting of aluminum and magnesium, the weight ratio of the finely divided metal ranging from 1.5:1 to 2:1, which element when burned generates hydrogen as part of the fuel.

2. The fuel element of claim 1 which has a protective layer of paraffin on the surface thereof.

3. The fuel element of claim 1 which has a thin layer of said finely divided metal on the surface thereof.

4. The fuel element of claim 3 which has a protective layer of paraffin overlying said finely divided metal layer.

5. The fuel element of claim 4 in which a layer of matted cellulose fibers is interposed between said metal and said paraffin layers.

6. The fuel element of claim 4 in which said finely divided metal is aluminum.

7. The fuel element of claim 1 in which said cellulose waste is taken from the group consisting of paper pulp, wood fibers, comminuted banana bark, bamboo, melaluca, straw, wheat grain, coffee, cocoa beans, coconut fibers, and palm wood.

8. The fuel element of claim 3 which carries a coating of waste oil taken from the group consisting of petroleum, banana, coconut, olive, peanut, corn, wheat germ, strawgrass and fish oils.

9. The fuel element of claim 8 having an external layer of paraffin.

* * * * *